United States Patent [19]

König

[11] 4,231,720
[45] Nov. 4, 1980

[54] PUMP FOR FLUID MEDIA HAVING DIFFERENT TEMPERATURES

[75] Inventor: Axel König, Wolfsburg, Fed. Rep. of Germany

[73] Assignee: Volkswagenwerk Aktiengesellschaft, Wolfsburg, Fed. Rep. of Germany

[21] Appl. No.: 886,768

[22] Filed: Mar. 15, 1978

[30] Foreign Application Priority Data

Mar. 23, 1977 [DE] Fed. Rep. of Germany ....... 2712679

[51] Int. Cl.³ .............. F04B 17/00; F03G 7/02; F03G 7/06
[52] U.S. Cl. ................................ 417/379; 60/529; 60/531; 60/641
[58] Field of Search ............... 417/375, 379; 60/531, 60/527, 529, 530, 641

[56] References Cited

U.S. PATENT DOCUMENTS

| | | | |
|---|---|---|---|
| 2,688,923 | 9/1954 | Bonaventura | 417/379 |
| 3,099,222 | 7/1963 | Poliseo | 417/379 |
| 3,309,012 | 3/1967 | Booth et al. | 417/379 |
| 4,041,707 | 8/1977 | Spector | 417/379 X |

Primary Examiner—Leonard E. Smith
Attorney, Agent, or Firm—Spencer & Kaye

[57] ABSTRACT

A pump for fluid media having different temperatures. The pump has two chambers for the two media, respectively, each chamber having an inlet and an outlet each provided with a respective check valve. The chambers are separated by a displacement body whose shape is a function of temperature and which, upon a change in shape due to a change in temperature, changes the sizes of the two chambers. The displacement body is arranged in the two chambers such that initially there is a greater heat exchange between the displacement body and the fluid in one of the chambers than there is between the displacement body and the fluid in the other of the chambers, but that subsequent to the shape change brought about by the heat exchange between the displacement body and the fluid in the one chamber, the heat exchange between the displacement body and the fluid in the other chamber will be greater than the heat exchange between the displacement body and the fluid in the one chamber.

17 Claims, 6 Drawing Figures

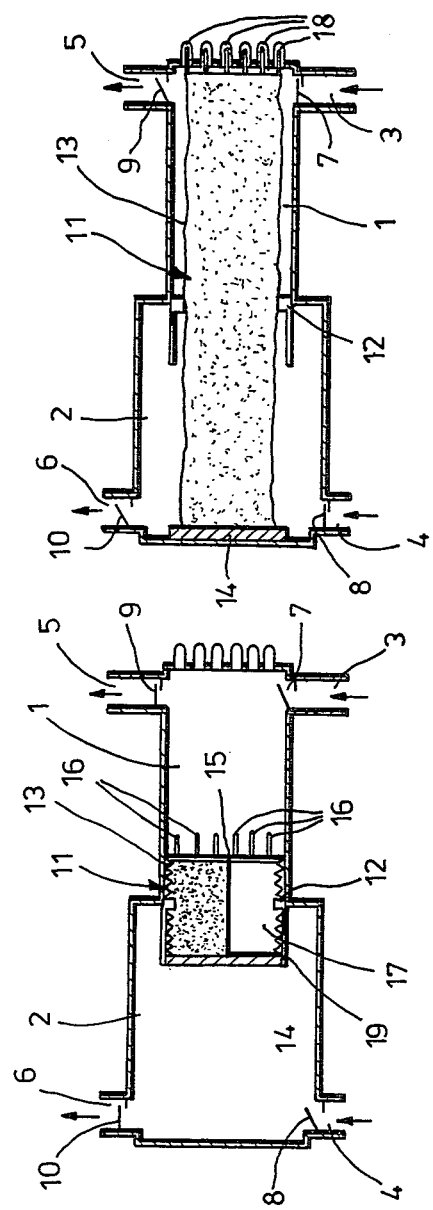

PUMP FOR FLUID MEDIA HAVING DIFFERENT TEMPERATURES

BACKGROUND OF THE INVENTION

The present invention relates to pumps, and more particularly to a pump for two fluid media having different temperatures.

In view of the current energy shortage, various efforts are being made to convert into mechanical energy either solar energy or heat which itself is produced as an inevitable concomitant of a fuel-consuming process. One way of doing this would be to provide a cylinder which is filled with a fluid and within which there is a piston which is pushed out of the cylinder under the pressure of the fluid, this fluid being exposed periodically to solar radiation. The piston acts on an eccentric which is mounted on a shaft, and the fluid is then pivoted so as to be exposed to a cold water reservoir whereupon the piston is returned into the cylinder. Such a solar engine is hardly practicable, considering the relatively large amount of energy it takes to run the parts of the engine itself. It is apparent, therefore, that if heat energy derived from the sun is to be converted into mechanical energy, one has to move away from conventional concepts of engine design.

The present invention, therefore, relates to the special problems incident to the development of a pump which can be operated by heat energy, and particularly by heat energy derived from the sun. The problem is thus closely related to the field of solar radiation collectors, inasmuch as such collectors normally operate using a circulating fluid medium, particularly water, in which cold medium is fed to the collector, this cold water being heated up and then moved to a warm water reservoir, as, for example, a swimming pool. In practice, the fluid is normally circulated by means of a pump, and in conventional systems, this pump is powered by externally generated electrical energy. It will readily be appreciated that it would be advantageous if the pump could be driven by energy derived from the heat energy which is obtained from the solar radiation, that is to say, if the pump could be operated without being dependent on energy derived from burning fossil fuels. Conventional solar energy collectors operate with relatively high efficiency, and the overall operation of these systems would not be adversely influenced if part of the heat energy derived from the collector were used to energize the pump which circulates the fluid medium through the system.

In practice, of course, a pump which is actuated without requiring any heat other than that which is brought in by the medium flowing through the pump, can be used for many other purposes. One example of this would be to use the pump for pumping water from a well into an above-ground storage tank.

It is, therefore, a primary object of the present invention to provide a pump which is energized solely by heat, and more particularly, a pump which is energized by two fluid media which are at different temperatures.

BRIEF DESCRIPTION OF THE INVENTION

With the above object in view, the present invention resides, basically, in a pump for two fluid media having different temperatures, which pump has two chambers for the two media, respectively. Each chamber has an inlet and an outlet, each being provided with a respective check valve. The chambers are separated by a displacement body whose shape is a function of temperature and which, upon a change in shape due to a change in temperature, changes the sizes of the two chambers. The displacement body is arranged in the two chambers such that initially there is a greater heat exchange between the displacement body and the fluid in one of the chambers than there is between the displacement body and the fluid in the other of the chambers, but that subsequent to the shape change brought about by the heat exchange between the displacement body and the fluid in the one chamber, the heat exchange between the displacement body and the fluid in the other chamber will be greater than the heat exchange between the displacement body and the fluid in the one chamber.

BRIEF DESCRIPTION OF THE DRAWINGS

FIG. 1 is a longitudinal sectional view of one embodiment of a pump according to the present invention, the parts being shown in one of their operative positions.

FIG. 2 is a longitudinal sectional view of the embodiment shown in FIG. 2, the parts being shown in another operative position.

DETAILED DESCRIPTION OF THE PREFERRED EMBODIMENTS

Figure 3:
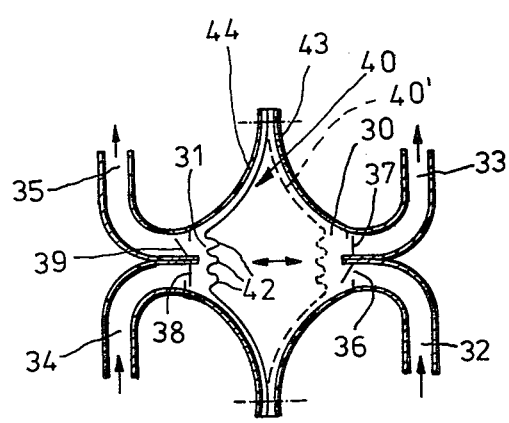
FIG. 3 is a longitudinal sectional view of another embodiment of a pump according to the present invention.

Referring now to the drawings and first to FIGS. 1 and 2 thereof, the same show one embodiment of a pump according to the present invention. The pump incorporates means forming first and second chambers 1 and 2, the same being provided with inlets 3, 4, and outlets 5, 6, respectively. Each inlet and outlet has a respective check-valve 7, 8, 9, 10, associated with it. The two chambers are connected to receive two fluid media having different temperatures, the first chamber 1 being the one which is supplied with the warmer of the two media, for example, a relatively warm fluid medium which has been heated up by a solar energy collector (not shown in FIGS. 1 and 2), whereas the second chamber 2 is supplied with the colder of the two fluid media.

The two chambers are separated by a displacement body 11 in the form of a heat-conductive flexible metal bellows 13 which extends into the two chambers 1, 2, and which, at approximately its central region, is fluid-tightly connected to the walls of the two chambers, as shown at 12, so as to form a seal between the two chambers. The end of the bellows 13 which extends into the chamber 2, which is connected to receive the colder of the two media, is closed off by an end plate 14 made of a thermal insulating material, whereas the end of the bellows 13 which extends into the first chamber 1, which is connected to receive the warmer of the two media, is closed off by an end plate 15 made of material that is a good conductor of heat. The end plate carries a plurality of external heat-conductive ribs 16 which promote heat exchange. In this embodiment, the hollow interior of the bellows 13 contains a volatile fluid substance 17 as, for example, a halogenated hydrocarbon, whose vapor pressure is a function of temperature.

FIG. 1 shows the bellows 13 in the position in which it is fully contracted, i.e., the position in which the bellows is at its smallest volume. Here, the substance is partly liquid and partly vaporous. In this position, and in any other position except when the bellows is fully extended—this being the maximum volume position depicted in FIG. 2—the ribs extend into the interior of chamber 1 and therefore into the warmer of the two media. In the fully retracted position, that portion of the bellows 13 which extends into the interior of chamber 2 which contains the colder of the two media, is surrounded by a generally cylindrical sleeve 19 which is made of heat-insulating material and forms a heat shield for impeding heat exchange between the substance 17 and the fluid medium in chamber 2.

When the bellows 13 is fully expanded, the ribs 16 are received in recesses 19 which are provided in the end wall of the chamber 1. The ribs 16 will thus be in the first chamber 1 containing the warmer of the two media whenever the bellows is other than at its largest volume, and the ribs 16 and sleeve 19, together serve as a heat exchange promoting and impeding means which are at maximum effectiveness to promote the heat exchange between the fluid medium in the chamber 1 and the fluid 17 in the bellows 13 and to impede the heat exchange between the fluid medium in chamber 2 and the fluid 17, only when the bellows has assumed the shape it adopts when the bellows is at its smallest volume.

As is likewise apparent from FIGS. 1 and 2, the volume of the chamber 2 which receives the colder of the two media is larger than the volume of the chamber 1 which receives the warmer of the two media. Moreover, the chambers are so dimensioned that when the bellows 13 extends into the chamber 1, the walls of the latter surround the bellows relatively tightly, whereas when the bellows 13 extends into the chamber 2, the walls of the latter surround the bellows with clearance, so that more space is left between the bellows 13 and the surrounding wall of chamber 2 than is left between the bellows 13 and the surrounding wall of the chamber 1.

The pump operates as follows:

Starting with the parts occupying the positions depicted in FIG. 1, this being the fully retracted, minimum volume position of the bellows 13, the heat exchange which occurs is predominantly that which takes place between the warm fluid medium in chamber 1 and the volatile substance 17 in bellows 13. In this position, the heat-conducting ribs 16 are exposed to the medium in chamber 1 so that the substance 17, which is at this point at least partly liquid, is heated up and this, in turn, increases the vapor pressure within the bellows 13. Consequently, the bellows begins to expand whereupon that portion of the bellows which extends into chamber 2 gradually emerges from the heat-insulating sleeve 19. As this happens, the heat exchange between the substance 17 in bellows 13 and the colder fluid medium in chamber 2 begins to increase—specifically, heat will now begin to flow from the substance 17 to the fluid in chamber 2—whereas the flow of heat from the warmer medium in chamber 1 to the substance 17 begins to decrease. The bellows will expand more or less rapidly until it reaches the position shown in FIG. 2, and in this position, the flow of heat from the medium in chamber 1 to the substance 17 will be very much decreased, partly because the heat-conductive ribs 16 are now within the recesses 18 and thus no longer exposed to the fluid medium in chamber 1 and partly because, due to the fact that, as described above, the wall of chamber 1 surrounds the bellows 13 relatively tightly, there is only a relatively thin fluid "jacket" which surrounds the bellows 13. This causes the liquid 17 within bellows 13 to cool down, bringing with it a reduced vapor pressure within the bellows, whereupon the bellows begins to contract. This has the two-fold effect of increasing the amount of heat exchange which can and does take place between the warmer fluid in chamber 1 and the liquid 17 while decreasing the amount of heat exchange between the liquid 17 and the colder fluid medium in chamber 2, particularly when the bellows 13 has withdrawn into the sleeve 19 so that the sleeve, together with the insulating end plate 14 of the bellows, acts as a shield which reduces the amount of heat exchange that can take place between the liquid 17 and the fluid in chamber 2. The bellows 13 thus once more assumes the position shown in FIG. 1, whereupon the above-described expansion and contraction process is repeated.

It will be appreciated that this continuous "breathing" of the bellows produces a pumping action for moving fluid medium into and out of both chambers. This is so because of the action of the check valves 7, 8, 9, 10, in that as the bellows expand, fluid media will be forced out through the outlet check valves 9, 10, while the inlet check valves 7, 8, remain closed, whereas when the bellows contract, fresh fluid will be sucked in through the now open check valves 7, 8, of the inlets 3, 4, while the check valves 9, 10, of the outlets 5, 6, are closed. The pumping action takes place "in-phase" in both chambers, i.e., fluid is either expelled from both chambers simultaneously or is sucked into both chambers simultaneously. All this is accomplished by utilizing the heat energy of the fluid medium flowing through chamber 1.

In practice, the parts will be dimensioned such that a given frictional holding force must be overcome before the bellows can move, so that the bellows will not start to move until a given minimum force is exceeded. This will prevent the pump from coming to rest as the result of an equilibrium state.

It will be seen from the above that the shape of the displacement body is a function of temperature and that, upon a change in shape due to a change in temperature, the displacement body changes the sizes of the two chambers 1, 2. It will, moreover, be seen that the displacement body is arranged in the chambers 1, 2, such that initially there is a greater heat exchange between the displacement body and the fluid in one of the chambers (e.g., chamber 1) than there is between the displacement body and the fluid in the other of the two chambers (e.g., chamber 2), but that subsequent to the shape change brought about by the heat exchange between the displacement body and the fluid in the one chamber (chamber 1), the heat exchange between the displacement body and the fluid in the other chamber (chamber 2) will be greater than the heat exchange between the displacement body and the fluid in the one chamber (chamber 1).

In other words, the interaction between the displacement body which changes its shape as a function of temperature is related to the temperatures of the two media. Initially, the dominant heat transfer is the transfer of heat from the warm medium to the bellows, resulting in expansion of the bellows which brings about the expulsion of fluid media from the chambers 1, 2, after which the dominant heat transfer is the transfer of heat away from the bellows to the colder medium in chamber 2, resulting in cooling down of the bellows and its contraction, which brings about the sucking in of fresh fluid into the chambers 1, 2.

Figure 4:
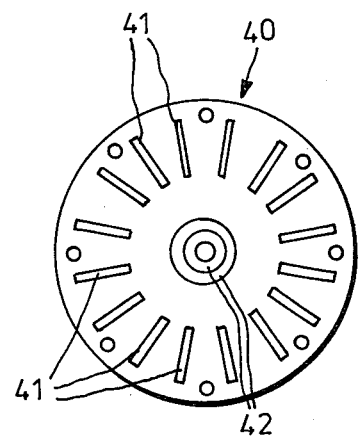
FIG. 4 is a plan view of a component incorporated in the pump shown in FIG. 3.

The embodiment of FIGS. 3 and 4 differs operationally from that of the embodiment of FIGS. 1 and 2 in that the warmer fluid is sucked into one of two chambers at the same time as the colder fluid is expelled from the other chamber, and that the warmer fluid is expelled at the same time as the colder fluid is sucked in. Here, too, there is a chamber 30 for the warmer of the two fluid media and a chamber 31 for the colder fluid medium, the chambers having inlets 32, 34, and outlets 33, 35, respectively, each having associated with it a respective check valve 36, 37, 38, 39. The displacement body is constituted by an elastic membrane 40 which is provided with bimetallic means such as bimetallic strips 41 which are circumferentially distributed, preferably rotationally symmetrically. The strips are oriented generally radially in a generally star-shaped pattern, and the membrane is provided, in its central region, with concentric ribs 42. This arrangement enables the membrane to snap back and forth between two stable configurations, one being indicated in FIG. 3 in solid lines in which the membrane bulges convexly toward chamber 31 and concavely toward chamber 30. In the other configuration, shown in FIG. 3 in broken lines, the membrane bulges convexly toward chamber 30 and concavely toward chamber 31. Which configuration the membrane assumes at any given time depends on the temperature to which the bimetallic strips are exposed.

As is apparent from FIG. 3, the membrane 40 moves between wall portions 43 and 44 of the chambers 30, 31, these wall portions being generally funnel-shaped so that the outer region of the membrane 40 comes to lie more or less snugly against the wall of the chamber toward which the membrane bulges convexly. Consequently, the bimetallic strips will be effectively shielded from the direct influence of the fluid medium of such chamber.

The pump shown in FIGS. 3 and 4 operates as follows:

Starting with the parts in the position shown in FIG. 3 in solid lines, the shape of the displacement body is such that the chamber 30 for the warmer fluid medium is much larger than the chamber 31 for the colder medium. The bimetallic strips 41 will therefore be exposed to the warmer fluid medium in chamber 30. The materials constituting the bimetallic strips 41 are so selected that these strips will, under the influence of the higher temperature, cause the membrane to snap from the position shown in solid lines into the position 40' shown in broken lines, whereupon the central region of the membrane will move rightwardly, as viewed in FIG. 3. This causes fluid medium to be expelled from the first chamber 30 by way of check valve 37 and outlet 33, and at the same time, the concomitant increase in the size of the chamber 31 will cause the colder fluid medium to be sucked into the chamber 31 via inlet 34 and check valve 38. The bulging and generally funnel-shaped outer region of the membrane 40 will now come to lie against the generally funnel-shaped wall portion 43 of the first chamber 30, so that there will be relatively little heat exchange between the bimetallic strips of the membrane and the warmer fluid in chamber 30. The bimetallic strips will, however, now be exposed to the temperature of the incoming colder fluid medium in chamber 31, so that it will be the heat exchange between the displacement body, i.e., the membrane 40, and the fluid in chamber 31 will now dominate, that is to say, it will be greater than the heat exchange between the bimetallic strips 41 and the fluid in the warm fluid chamber 31. The bimetallic strips 41 will thus be cooled and will ultimately cause the membrane 40 to snap back into the position shown in solid lines. Consequently, cold fluid is expelled from chamber 31 via check valve 39 and outlet 35 while fresh warm fluid is sucked into chamber 30 via inlet 32 and check valve 36.

The above back and forth movement will then repeat itself so long as fluid media of different temperatures continue to flow through the pump. Inasmuch as the membrane is configured so as to snap back and forth between its two stable configurations, there is no danger that the membrane will remain stuck in an intermediate position, so that the pump embodiment of FIGS. 3 and 4 is inherently incapable of assuming an equilibrium position between the two end positions.

Figure 5:
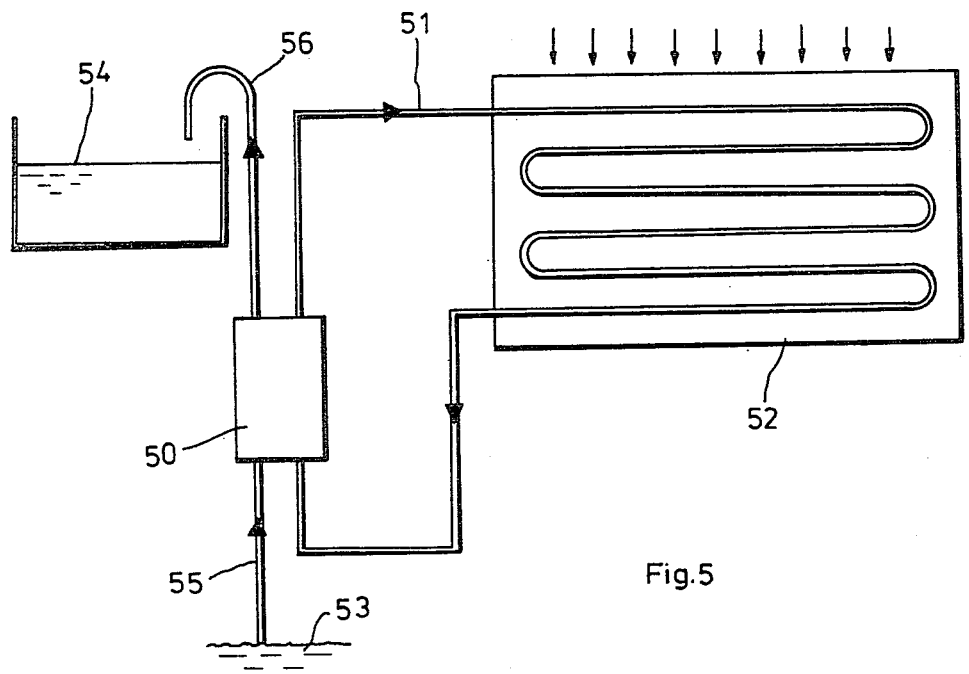
FIG. 5 is a schematic flow diagram showing one practical application of a pump according to the present invention.

FIG. 5 is a schematic diagram showing how a pump according to the present invention, indicated here generally at 50, may be used. The warm fluid chamber of the pump, not shown specifically in FIG. 5, is connected via a conduit system shown generally at 51 with a solar heat collector 52, so that the water warmed by the solar heat collector enters the warm fluid chamber of the pump. The inlet of the cold fluid chamber of the pump is connected to a well 53 and the outlet of the cold fluid chamber is connected to deliver the water being pumped up to an above-ground storage tank 54, suitable pipes or conduits 55, 56, being provided for this purpose. The pump thus serves a two-fold function, namely, to circulate water through the solar heat collector, and to pump water from one location to another. The energy for this is derived from the warmer water, this being done in a way which allows the warm water to be utilized still further, as shown in FIG. 6.

Figure 6:
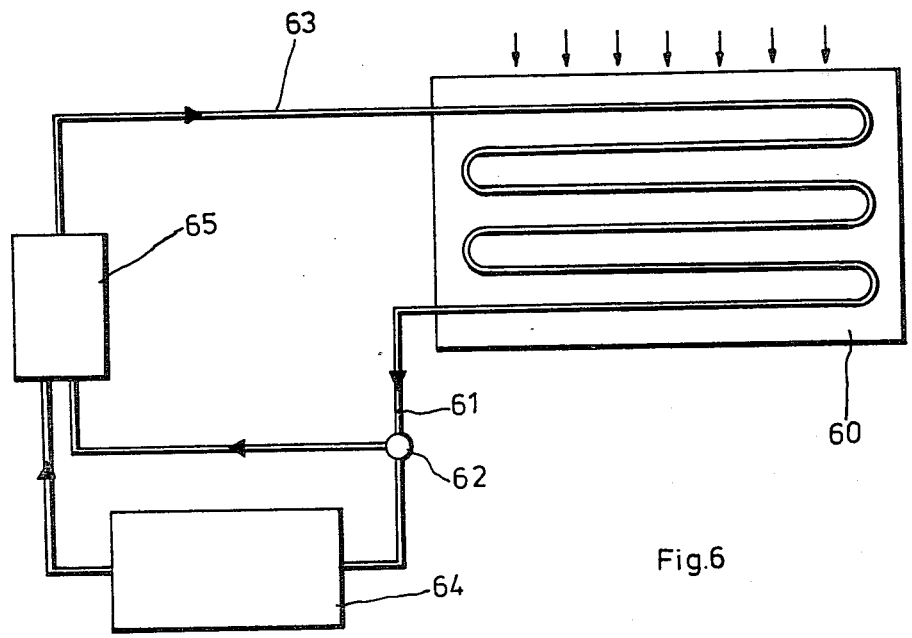
FIG. 6 is a schematic flow diagram showing another practical application of a pump according to the present invention.

FIG. 6 shows a solar heat collector 60 whose outlet conduit 61 is connected to a divider and controller 62. Here the water flowing into the collector 60 by way of its inlet conduit 63 and through the outlet conduit 61 is divided into two branches, one leading to a warm water reservoir 64 and the other to the warm fluid chamber of the pump 65, the latter being a pump according to the present invention. The cold fluid inlet of the pump 65 is fed by the outlet of the reservoir 64, so that the pump is energized under the influence of the temperature difference between the two incoming fluid media. The two outlets of the pump 65 are combined; this can, in practice, be done by an internal connection between the outlet of the warm fluid chamber and the outlet of the cold fluid chamber, so that the pump has but a single common outlet which communicates with the inlet conduit 63 leading to the solar heat collector.

It will be understood that the above description of the present invention is susceptible to various modifications, changes and adaptations, and the same are intended to be comprehended within the meaning and range of equivalents of the appended claims.

What is claimed is:

1. A pump for fluid media having different temperatures, comprising:
    (a) means forming a first chamber for the warmer of the two media and having an inlet and an outlet as well as two respective check valves therefor;

(b) means forming a second chamber for the colder of the two media and having an inlet and an outlet as well as two respective check valves therefor;

(c) an at least partially heat conducting displacement body separating said chambers from one another and being arranged for exposure to the media in said chambers for effecting a first heat exchange between said displacement body and the fluid in one of said chambers and for effecting a second heat exchange between said displacement body and the fluid in the other of said chambers; said displacement body including means responsive to temperature changes derived from said first heat exchange for effecting deformation of said displacement body whereby the sizes of said first and second chambers are varied; said displacement body having a first state prior to response to said temperature changes and a second, deformed state subsequent to response to said temperature changes;

(d) means for effecting in said first state of said displacement body a greater said first heat exchange than said second heat exchange and (e) means for effecting in said second state of said displacement body a greater said second heat exchange than said first heat exchange.

2. In combination with a pump as defined in claim 1, means for supplying the two fluid media of different temperature to said two pump inlets, respectively, from a common source.

3. The combination defined in claim 2, further comprising means for combining the flow of media leaving said outlets of said first and second chambers.

4. For use with a solar heat collector having a fluid medium inlet and a fluid medium outlet, the combination defined in claim 3, wherein said solar heat collector outlet is said common source and solar heat collector inlet is connected to receive the combined flow of media from said outlets of said first and second chambers of said pump.

5. A pump as defined in claim 1, wherein said displacement body is a membrane which is provided with bimetallic means for causing the membrane to change its shape between two configurations in one of which said membrane bulges convexly toward one of said chambers and concavely toward the other of said chambers and in the other of which configurations said membrane bulges convexly toward said other chamber and concavely toward said one chamber.

6. A pump as defined in claim 5, wherein said chambers have generally funnel-shaped walls against which said membrane comes to lie whenever it bulges convexly into the respective chamber.

7. A pump as defined in claim 5, wherein said membrane is elastic and wherein said bimetallic means comprise a plurality of circumferentially distributed, generally radially oriented bimetallic strips.

8. A pump as defined in claim 5, wherein said membrane is provided, in its central region, with concentric ribs.

9. A pump as defined in claim 1, wherein said displacement body is an extensible, hollow body which is filled with a volatile substance which exerts a pressure that is a function of temperature, said body projecting into said first and second chambers.

10. A pump as defined in claim 9, wherein the volume of said second chamber is large than the volume of said first chamber.

11. A pump as defined in claim 9, wherein said first chamber, when said displacement body extends into it, surrounds the same relatively tightly, whereas said second chamber, when said displacement body extends into it, surrounds the same with clearance, so that more space is left between said displacement body and the surrounding wall of said second chamber than is left between said displacement body and the surrounding wall of said first chamber.

12. A pump as defined in claim 9, wherein said displacement body is provided with heat exchange promoting and impeding means which are at maximum effectiveness to promote the heat exchange between the fluid medium in said first chamber and the volatile substance in said displacement body and to impede the heat exchange between the fluid medium in said second chamber and the volatile substance in said displacement body only when said displacement body has assumed the shape it adopts when it is at its smallest volume.

13. A pump as defined in claim 9, wherein said hollow displacement body is a flexible bellows made of heat-conductive material, said bellows being closed at its end faces, said bellows, at approximately its central region, being fluid-tightly connected to walls of said first and second chambers so as to form a seal between said first and second chambers.

14. A pump as defined in claim 13, further comprising a sleeve arranged in said second chamber, said sleeve extending from said seal and surrounding said bellows, the length of said sleeve being such that when said bellows is at its smallest volume, it is at least partly within said sleeve.

15. A pump as defined in claim 13, wherein that end face of said bellows which is in said second chamber is made of heat-insulating material.

16. A pump as defined in claim 13, wherein that end face of said bellows which is in said first chamber is provided with heat-conductive ribs which, when said bellows is other than at its largest volume, are exposed to the fluid medium in said first chamber.

17. A pump as defined in claim 16, wherein said first chamber is provided with a wall having recesses which, when said bellows is at its largest volume, receive said ribs.

* * * * *